United States Patent
Reynolds et al.

(10) Patent No.: US 12,123,121 B2
(45) Date of Patent: Oct. 22, 2024

(54) METHOD FOR MANUFACTURING A CARPET OR A RUG AND A CARPET OR RUG OBTAINED THEREBY

(71) Applicant: ALADDIN MANUFACTURING CORPORATION, Calhoun, GA (US)

(72) Inventors: Charles Winston Reynolds, Calhoun, GA (US); Mark Gregory Dye, Rome, GA (US); Michael Bejon Sethna, Cohutta, GA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 0 days.

(21) Appl. No.: 16/982,409

(22) PCT Filed: Feb. 28, 2019

(86) PCT No.: PCT/US2019/019977
§ 371 (c)(1),
(2) Date: Sep. 18, 2020

(87) PCT Pub. No.: WO2019/182738
PCT Pub. Date: Sep. 26, 2019

(65) Prior Publication Data
US 2021/0071333 A1    Mar. 11, 2021

Related U.S. Application Data

(60) Provisional application No. 62/645,390, filed on Mar. 20, 2018.

(30) Foreign Application Priority Data
May 29, 2018    (EP) ..................... 18174728

(51) Int. Cl.
*D05C 17/02* (2006.01)
*D05C 15/04* (2006.01)
*D06N 7/00* (2006.01)

(52) U.S. Cl.
CPC ............. *D05C 17/02* (2013.01); *D05C 15/04* (2013.01); *D05C 17/023* (2013.01);
(Continued)

(58) Field of Classification Search
CPC .. D06N 7/0063; D06N 7/0068; D06N 7/0076; D06N 7/0081; D06N 2201/02;
(Continued)

(56) References Cited

U.S. PATENT DOCUMENTS

| 3,110,905 A | 11/1963 | Rhodes |
| 3,895,151 A | 7/1975 | Matthews et al. |

(Continued)

FOREIGN PATENT DOCUMENTS

| CA | 2094875 A1 | 11/1993 |
| DE | 19518069 A1 | 11/1996 |

(Continued)

OTHER PUBLICATIONS

JP 3434020 B2 translation by Google Patents (Year: 1994).*
(Continued)

*Primary Examiner* — Cheryl Juska
(74) *Attorney, Agent, or Firm* — Meunier Carlin & Curfman LLC

(57) ABSTRACT

Method for manufacturing a carpet or a rug, comprising the following steps: the step (S1-S2) of providing a primary backing (1), being a woven or non-woven layer comprising filaments (2) of polyethyleneterephthalate and copolymer of polyethyleneterephthalate, the coPET having a lower melting temperature than the PET and wherein said PET is available in said primary backing (1) in a higher amount than
(Continued)

said coPET; the step of providing a glue layer (11) consisting for 50% or more out of coPET; the step of tufting yarn at least into said primary backing (1); the step of activating said glue layer (11) at least for partially fixing said yarn (12) on said primary backing (1). The invention also concerns carpets (16) and rugs that are obtained or obtainable by means of such method.

11 Claims, 5 Drawing Sheets

(52) U.S. Cl.
CPC ......... *D06N 7/0063* (2013.01); *D06N 7/0068* (2013.01); *D06N 7/0076* (2013.01); *D06N 7/0081* (2013.01); *D06N 2201/02* (2013.01); *D06N 2205/14* (2013.01); *D06N 2211/066* (2013.01); *D06N 2213/02* (2013.01); *D10B 2331/04* (2013.01); *D10B 2503/04* (2013.01); *D10B 2503/041* (2013.01); *D10B 2503/042* (2013.01); *Y10T 428/23979* (2015.04); *Y10T 428/23993* (2015.04)

(58) Field of Classification Search
CPC ......... D06N 2203/061; D06N 2205/10; D06N 2205/02; D06N 2211/066; D06N 2213/02; D05C 15/04; D05C 17/02; D05C 17/023; D10B 2331/04; D10B 2503/04; D10B 2503/041; D10B 2503/042; Y10T 428/23979; Y10T 428/23993; D04H 3/018; D04H 3/14; D04H 3/147; D04H 3/153; B32B 2262/14; B32B 2262/144; B32B 2262/148; B32B 2262/16; B32B 2262/12; B32B 2262/124; B32B 2262/128
USPC ........ 442/192, 195, 196, 197, 199, 200, 415
See application file for complete search history.

(56) References Cited

U.S. PATENT DOCUMENTS

| | | | |
|---|---|---|---|
| 3,940,535 A | | 2/1976 | Gaeth et al. |
| 4,576,665 A | | 3/1986 | Machell |
| 5,030,497 A | | 7/1991 | Claessen |
| 5,173,356 A | | 12/1992 | Eaton et al. |
| 5,240,530 A | | 8/1993 | Fink |
| 5,481,786 A | | 1/1996 | Smith et al. |
| 5,532,035 A | | 7/1996 | Corbin et al. |
| 5,538,776 A | | 7/1996 | Corbin et al. |
| 5,604,009 A | | 2/1997 | Long et al. |
| 5,630,896 A | * | 5/1997 | Corbin ................. D06N 7/0076 156/72 |
| 6,274,521 B1 | | 8/2001 | Barbier et al. |
| 6,808,786 B2 | | 10/2004 | Theiss |
| 6,849,565 B1 | * | 2/2005 | Gardner ............... D06N 7/0081 428/95 |
| 2003/0175475 A1 | * | 9/2003 | Higgins .................... B32B 5/06 428/95 |
| 2004/0151870 A1 | * | 8/2004 | Theiss ...................... B32B 5/06 428/95 |
| 2005/0147787 A1 | * | 7/2005 | Bailey ...................... B32B 5/06 442/268 |
| 2007/0172630 A1 | | 7/2007 | Jones et al. |
| 2007/0202769 A1 | | 8/2007 | Groner et al. |
| 2008/0017294 A1 | | 1/2008 | Bailey et al. |
| 2008/0213531 A1 | * | 9/2008 | Goffing .................. D05C 17/02 156/72 |
| 2010/0092721 A1 | | 4/2010 | Maltha et al. |
| 2012/0244310 A1 | * | 9/2012 | Visscher ................ B32B 5/022 428/95 |
| 2013/0168007 A1 | | 7/2013 | Cote et al. |
| 2015/0118437 A1 | | 4/2015 | Schulze et al. |
| 2015/0176164 A1 | | 6/2015 | Lucas |
| 2016/0108573 A1 | | 4/2016 | Tichelaar et al. |
| 2017/0080679 A1 | | 3/2017 | Bathelier et al. |
| 2017/0100914 A1 | | 4/2017 | Visscher |
| 2017/0152417 A1 | | 6/2017 | Tichelaar et al. |
| 2017/0211218 A1 | | 7/2017 | Nitschke et al. |
| 2018/0030632 A1 | | 2/2018 | Reutelingsperger |
| 2018/0320310 A1 | | 11/2018 | Reutelingsperger |
| 2019/0323172 A1 | | 10/2019 | Tichelaar et al. |
| 2021/0087743 A1 | * | 3/2021 | Reynolds ............. D06N 7/0068 |
| 2022/0195662 A1 | | 6/2022 | Tyler |

FOREIGN PATENT DOCUMENTS

| | | |
|---|---|---|
| EP | 0568916 A1 | 11/1993 |
| EP | 0902115 A2 | 3/1999 |
| JP | H08-224158 A | 9/1996 |
| JP | 3434020 B2 | 8/2003 |
| WO | 9312285 A1 | 6/1993 |
| WO | WO-1993/012285 A1 | 6/1993 |
| WO | WO-2006/037371 A1 | 4/2006 |
| WO | WO-2017/129318 A1 | 8/2017 |
| WO | 2019182738 A1 | 9/2019 |

OTHER PUBLICATIONS

Extended European Search Report for European Application No. 18174728.8, Aug. 2, 2018, (9 pages), European Patent Office, Munich, Germany.

International Searching Authority, International Search Report and Written Opinion for International Application No. PCT/US2019/019977, Apr. 26, 2019, (11 pages), U.S. Patent and Trademark Office, USA.

Non-Final Office Action issued in U.S. Appl. No. 17/753,503, mailed Jun. 27, 2024.

* cited by examiner

METHOD FOR MANUFACTURING A CARPET OR A RUG AND A CARPET OR RUG OBTAINED THEREBY

CROSS REFERENCE TO RELATED APPLICATIONS

This application is a National Stage Application, filed under 35 U.S.C. § 371, of International Application No. PCT/US2019/019977, filed Feb. 28, 2019 which claims priority to European Application No. 18174728.8, filed May 29, 2018, and U.S. Provisional Application No. 62/645,390, filed Mar. 20, 2018; the contents of which are hereby incorporated by reference in their entirety.

BACKGROUND

Related Field

The present invention relates to a method for manufacturing a carpet or a rug. The invention also relates to a carpet or a rug obtained or obtainable thereby. The carpet at issue may be a broadloom carpet with a width of 6 feet (about 1.83 m) or more, and provided in endless length, e.g. from a roll. Alternatively the invention concerns a rug with a limited length.

Description of Related Art

More particularly the invention is related to a method for manufacturing a carpet or a rug by means of at least a so-called tufting operation. During a tufting operation yarn is inserted into a primary backing material. The yarn may conventionally be a PET (polyethyleneterephthalate) based, PP (Polypropylene) based or Nylon based yarn, wherein the Nylon based yarn is mainly aiming at carpets for commercial applications. The primary backing material may be a woven layer of PP slit tape yarn. The bottom side of the primary backing may then be coated with a latex in order to permanently adhere the yarn to the backing. In order to provide dimensional stability to the carpet, a secondary backing, e.g. of a woven PP layer, may be adhered over a further latex layer. The latex applied may be heavily filled to provide weight to the carpet. Carpets having the above described configuration are difficult to recycle and most often are disposed of in a landfill. A carpet configuration as described above is for example disclosed in US 2003/175, 475, along with a plethora of other possible configurations.

U.S. Pat. No. 5,532,035, EP 0 568 916, US 2007/172,630, U.S. Pat. No. 5,481,786 and WO 93/12285 all disclose carpet configurations that are easier to recycle. EP 0 568 916, for example, discloses a tufted fabric made of only one type of thermoplastic material, such as a carpet exclusively made from PET, with the aim of providing a completely recyclable tufted fabric. The binding or fixing of the tufted yarn on the primary backing is obtained via melting coPET containing binding fibers of the primary backing. The present inventor has recognized that, in embodiments according to EP'916, the binding of the tufted yarn may sometimes be insufficient. Such insufficient binding may lead to problems in production and/or in use.

BRIEF SUMMARY

The present invention in the first place aims at an alternative method for manufacturing carpet or rugs, which, in accordance with several preferred embodiments may yield a recyclable carpet or rug, and/or may yield a carpet or rug that provides a solution to the problems of the state of the art.

With this aim, the present invention, in accordance with its first independent aspects concerns a method for manufacturing a carpet or a rug, wherein the method comprises the steps of:
the step of providing a primary backing;
the step of providing a glue layer;
the step of tufting yarn at least into said primary backing;
the step of activating said glue layer at least for partially fixing said yarn on said primary backing;
characterized in that
said primary backing is a woven or non-woven layer comprising filaments comprising polyethylene terephthalate (PET);
said glue layer is a layer comprising copolymer of polyethylene terephthalate (coPET) wherein the coPET has a lower melting temperature than the PET.

Filaments are to be understood as both fine thread or fiber, and hence may be continuous filaments, or fibers with limited length, also referred to or known as staple fibers. Staple fibers typically have a length in the range of 10 to 500 mm, whereas continuous filaments typically are filaments with a length longer than 500 mm.

The primary backing may be a woven or non-woven layer comprising continuous filaments (2) of PET (polyethylene terephthalate). The primary backing may be a woven or non-woven layer comprising filaments of PET (polyethylene terephthalate) and coPET (copolymer of polyethylene terephthalate), wherein the coPET has a lower melting temperature than the PET and wherein said PET is available in said primary backing in a higher amount than said coPET.

The glue layer may be a layer comprising at least 15% of coPET, such as at least 20%, even at least 30%, optionally at least 40% or even at least 50%.

The method may comprise at least the following steps:
the step of providing a primary backing;
the step of providing a glue layer;
the step of tufting yarn at least into said primary backing;
the step of activating said glue layer at least for partially fixing said yarn on said primary backing;
with as a characteristic that
said primary backing is a woven or non-woven layer comprising, preferably continuous, filaments of PET (polyethyleneterephthalate) and coPET (copolymer of polyethyleneterephthalate), wherein the coPET has a lower melting temperature than the PET and wherein said PET is available in said primary backing in a higher amount than said coPET;
said glue layer is a layer consisting for more than 50% out of coPET and/or a layer having a polymer content that consists for 50% or more out of coPET.

The coPET that melts at a lower temperature acts as a binder while the PET yields and preferably maintains the structural integrity of the primary backing, the glue layer and/or the carpet or rug as a whole. The combination of a high amount of PET in the primary backing and a high amount of coPET in the glue layer leads to a higher tenacity and better initial tuft holding in the primary backing, while having sufficient adhesive available to fix the yarn in the final carpet, without unacceptably compromising the strength of the tufted fabric.

Preferably said yarn is a yarn based on PET. Such an embodiment would be extremely convenient to recycle. However, it is not excluded that the yarn would be another type, such as nylon or polypropylene. Convenient separation techniques exist for e.g. separating nylon or polypropylene from PET, such as sink-float separation, and may be used for recycling carpet scrap containing both PET and PP or Nylon. The PET used to provide the tuft yarn may be PET obtained from recycled material, e.g. from PET bottles or carpet waste, i.e. PET carpet waste.

For embodiments of the primary backing having filaments of both PET and coPET, those filaments may be formed as separate homo/homo filaments. These filaments may be intermingled, either during initial formation or during a post-formation processing step like hydro-entangling. In addition, or alternatively, the filaments in said primary backing at least comprise bicomponent filaments. Bicomponent filaments are known per se, e.g. from US 2007/172, 630. The filaments are made from two components distributed over, preferably, the entire length of the fiber. In the context of the present invention according to its first aspect, filaments are meant that comprise PET and coPET as components. The use of bicomponent fibers leads to an acceptable uniformity in the distribution of PET and coPET in said primary backing, as well as to a sufficiently dense network of fibers that at least contain the stronger PET component. These features lead to a high initial yarn or tuft holding capacity, as well as to uniform distribution of the lower melting coPET.

Said bicomponent filaments may take a variety of shapes, of which here below some important possibilities are discussed.

According to a second possibility, said bicomponent filaments are of the sheath/core type. The bicomponent filaments are of the sheath/core type wherein the core is preferably PET, while the sheath is coPET. Preferably a concentric configuration is used, but an eccentric configuration is not excluded. A bulky filament may be obtained due to differences in shrinkage rate between the sheath and the core, especially in the cases where the sheath of coPET is at least 15 wt % of the filament.

According to a third possibility, said bicomponent filaments are splittable upon the application of mechanical energy into finer fibers. In this way it may be obtained that the filaments are more easy to entangle to form a non-woven layer, for example by means of needling or hydroentangling.

In the alternative, the primary backing may comprise PET filaments and coPET filaments, which filaments may be intermingled. Though the PET and coPET filaments may have an identical thickness (or dfp), the coPET filaments may be of a different, preferably smaller filament titer as compared to the PET filaments. The PET filaments may have a titer in the range of 6 to 10 denier (0.667 to 1.111 tex), the coPET filaments may have a titer of 2 to 5 denier (0.222 to 0.556 tex). The cross sectional shapes of the coPET and PET filaments may be identical or different.

According to a further possibility, said filaments, such as the bicomponent filaments, have a multilobal, preferably a trilobal, cross section, wherein the core is preferably PET, while at least a part of the outer surface of one or more of the lobes, preferably all lobes, such as all three lobes, is provided by coPET.

Preferably, in case of bicomponent filaments, a substantial part of the outer part of the lobes is coPET.

Preferably said filaments in said primary backing comprise filaments have a circular cross-section. The circular cross-section is particularly helpful during the tufting operation. The filaments are easily pushed sideward by the needles of the tufting machine. According to a variant, said filaments in said primary backing comprise filaments have a multilobal, preferably trilobal, cross-section. Multilobal, and particularly trilobal configurations, allow obtaining a dense network in the woven or non-woven layer, since the cross-section allows for stacking of the fibers in a more effective manner than for example in the case of circular filaments. The tenacity of the primary backing, and the tuft holding, may profit from such a multilobal, preferably trilobal filament shape, while sufficient loft of the fabric is maintained. Multilobal, particularly trilobal filaments provide a more uniform dispersion of the lower melting coPET, such that the primary backing is more effective in itself as a glue layer. For this reason a lower weight glue layer, for example with a surface weight of less than 100 grams per square meter, may be used in combination with a primary backing that contains or essentially consists of multilobal, e.g. trilobal, filaments.

Preferably said PET is available in said primary backing in an amount of at least 60 weight percent, or at least 75 weight percent. It is important to have sufficient high melting PET in the primary backing, to ensure sufficient tenacity and tuft holding.

In accordance with the above, preferably, said coPET is available in said primary backing in an amount of 40 weight percent or lower, or 25 weight percent or lower.

However, according to other embodiments, the primary backing may be of 100% PET.

According to some embodiments, the primary backing material may be a woven layer, such as a woven layer of PP slit tape yarn or a woven layer of PET slit tape yarn. This PET may be obtained from recycled material, e.g. from PET bottles or carpet waste, i.e. PET carpet waste.

Alternatively, the primary backing may be a non-woven layer. The primary backing may be a non-woven layer provided by means of spunbonding technology, meltblowing, carding and/or needling.

Preferably said primary backing is a non-woven layer provided by means of spunbonding technology. The technique of spunbonding for the production of non-woven layers is known per se, for example from WO 2017/129,318. Preferably the spunbonded filaments of said primary backing are compacted or bound, e.g. using calenders.

According to an alternative said primary backing is a non-woven layer provided by meltblowing, carding and/or needling. These techniques are also known per se for the production of non-woven layers. In the case of meltblowing reference is made, for example to WO 2006/037371. According to still another alternative, said primary backing is a woven layer of, e.g. extruded, yarn, wherein such yarn in itself than preferably comprises a bundle of continuous filaments of both PET and coPET, and/or continuous bicomponent filaments of PET/coPET as described above.

According to a special embodiment said primary backing is a non-woven layer provided by means of a combination of at least spunbonding technology and meltblowing. The non-woven layer may for example be composed of several sublayers each obtained via one of the above technologies. A central layer may be obtained by spunbonding while two opposite outer layers may be obtained by meltblowing, or the other ways around. The composing layers may be of different composition. The outer layers may be comprising more coPET than the central layer. The outer layers may even function as the glue layer and comprise more than 50 percent of coPET, while the central layer comprises more PET than coPET. The present special embodiment leads to a stronger non-woven layer, as compared to a non-woven layer which is obtained by e.g. meltblowing only. Meltblowing generally leads to small filament size.

In any case, said primary backing preferably is at least subjected to through-air bonding in order to bind the web of said primary backing. The through-air bonding technique involves passing hot air through an unbonded web to at least partially melt the polymer fibers, e.g. at least part of the lower melting coPET. The coPET hence may be present in the primary backing as masses of coPET, resembling like islands or blobs or lumps, anchored around the PET filaments or the remainders of the bicomponent filaments, in particularly at locations where PET filaments cross each other.

Preferably said primary backing is essentially or wholly built from bicomponent filaments having a ratio of PET-coPET between 75:25 and 85:15, preferably about 80:20.

Preferably said filaments in said primary backing have a size higher than 4 dpf (denier per filament or grams per 9000 meters of the individual filament) or 0.445 tpf (tex per filament or grams per 1000 meters of the individual filament,) preferably 6 or 8 dpf (0.667 or 0.889 tpf) or larger. The larger weight per filaments makes for a higher tenacity per filament, and hence a higher tenacity for the primary backing. The inventor has noted that this adds to the strength in the machine and cross directions of the non-woven layer. The resistance to puncture while tufting is minimized, while strength after needling, or even after tufting, is maintained to a large extent. According to a variant said filaments in said primary backing have a size of 2 dpf (0.222 tpf) or lower. Because of a lower weight per filament, more filaments per unit area may be available in the primary backing, and then in this way a higher tenacity is reached.

Preferably said glue layer is a woven or non-woven layer comprising filaments comprising coPET (copolymer of polyethyleneterephthalate), wherein the coPET has a lower melting temperature than PET. The glue layer may be a woven or non-woven layer comprising filaments of PET (polyethyleneterephthalate) and coPET (copolymer of polyethyleneterephthalate), wherein the coPET has a lower melting temperature than the PET and wherein said PET is available in said glue layer in a lower amount than said coPET. The filaments in said glue layer preferably at least may comprise bicomponent filaments, which may be of the homo/homo type, or of the sheath/core type, wherein the core is preferably PET, while the sheath is coPET. In the alternative, the glue backing may comprise PET filaments and coPET filaments, which filaments may be intermingled. Though the PET and coPET filaments may have an identical thickness (or dpf), the coPET filaments may be of a different, preferably smaller filament titer as compared to the PET filaments. The cross sectional shapes of the coPET and PET filaments may be identical or different.

Preferably said filaments in said glue layer comprise filaments have a circular cross-section, or a multilobal, preferably trilobal, cross-section.

Preferably, said coPET is available in said glue layer in an amount of at least 20 weight percent or at least 25 weight percent, such as at least 50 weight percent, even at least 60 weight percent such as at least 75 weight percent.

Preferably said PET is available in said glue layer in an amount of 40 weight percent or less, or 25 weight percent or less.

Preferably said glue layer is a non-woven layer provided by means of spunbonding technology.

Preferably said glue layer is essentially or completely provided from bicomponent filaments having a ratio of PET-coPET between 85/15 and 15/85, such as between 80/20 and 20/80, even between 75/25 ad 25/75, or between 15:85 and 25:75, preferably about 20:80. Preferably the spunbonded filaments of said glue layer are uncompacted. Compaction and/or calendering of the glue layer has a risk of lowering loft.

It is noted that the high coPET/PET ratio in a bicomponent fiber for the glue layer leads to bulky filaments, which are advantageous for the glue layer.

Preferably said filaments in said glue layer have a size smaller than 5 dpf (0.556 tpf), preferably 3 dpf (0.333 tpf) or smaller.

The glue layer and the primary backing may be combined in accordance with several possibilities therefor.

In accordance with a first possibility, said glue layer is applied to the primary backing after the relevant part of said primary backing has been tufted. In this embodiment the resistance to puncturing in the tufting process is minimized and the design of the glue layer is not restricted due to the tufting process. For example, any problems with a low strength in a glue layer provided as a non-woven layer are obviated. The glue layer is mostly inherently weak due to its lower PET content.

In accordance with a second possibility, said glue layer is applied to the primary backing before the relevant part of said primary backing is tufted, wherein the step of tufting comprises tufting yarn into at least said primary backing and said glue layer. The primary backing and said glue layer are then afterwards thermally fused to bind the yarn tufts. In this embodiment a better eventual fixing of the yarn may be obtained since the glue layer is incorporated in the tufted fabric. In the case of a non-woven glue layer, a high coPET amount improves loft in the glue layer, which is advantageous in the tufting machine. Preferably, in such embodiment, the glue layer consists of a non-woven layer of, e.g. spunbonded, bicomponent filaments which are uncompacted, with the aim of maximizing the loft in the glue layer. According to a special embodiment of this possibility said glue layer is applied on top of said primary backing. Although it may be more difficult to supply enough energy to obtain sufficient fixing of the yarn in such case, such embodiment is not excluded.

Preferably, however, as well in said first as in said second possibility, said glue layer is applied on the bottom of said primary backing; i.e. the carpet's or rugs bottom side, which will face the subsurface under the carpet or rug.

Preferably said glue layer and said primary backing are bonded to one another in said step of activating said glue layer. This activation may be executed by means of heat and/or pressure.

Preferably said step of activating said glue layer is at least executed by means of calender bonding or by means of a rotary thermal lamination device. Preferably said step of activating said glue layer is at least executed by means of calender bonding with heat and/or pressure.

Preferably, the coPET used in the context of the present invention is a PET having a melting temperature in the range 120-240° C., preferably 140-160° C. Preferably said coPET has a glass transition temperature lower than 35° C.

Possible coPET compositions for use in the primary backing and/or the glue layer are PET modified with diols or diacids, such as respectively with cyclohexane dimethanol or isophtalic acid. The inventor obtained good results with the coPET's commercialized by the company EMS-Chemie AG under the names EMS Griltex D 1387 E or EMS Griltex D 1848 E.

Preferably a polyethylene terephthalate/isophthalate copolymer is used for the coPET, for example with a mol ratio isophthalate/terephthalate of about 20 to 40%.

Preferably, said glue layer has a surface weight of at least 85 grams per square meter, or at least 2.5 oz/yd², and preferably at least 135 grams per square meter or at least 4 oz/yd².

Such glue layer allows a sufficient fixing of the yarn on the primary backing, while maintaining loft in the glue layer, in the cases where the glue layer is applied as a non-woven layer, for example consisting of spunbond bicomponent filaments.

Preferably said primary backing has a surface weight of at least 100 grams per square meter or at least 3 oz/yd². According to this embodiment, the primary backing has a convenient strength to allow initial yarn holding. A surface weight of at least 120 grams per square meter or at least 3.5 oz/yd² is still better. According to variants, it is not excluded that said primary backing has a surface weight which is 100 grams or lower.

Conveniently, said primary backing may further include a lubricant, e.g. silicone or ester, e.g. in an amount of 0.1 to 1 wt %. Such lubricant may increase the movability of the filaments during needling or during tufting, namely with a minimum of filament breaks, such that strength is maintained to a large extent after needling, or even after tufting. The glue layer, in the cases where it is a woven or non-woven layer, may also profit from including a lubricant in the same or similar amount, namely 0.1 to 1 wt % as well. In the cases where a composite of glue layer and primary backing is tufted, lubricating may increase loft, leading to a more fluent tufting operation.

According to an important other possibility for the glue layer, said glue layer is at least provided as a powder comprising said coPET, or as a powder of coPET.

It is clear that said glue layer, besides said coPET and PET, may comprise non polymeric content, such as non-polymeric filler materials, preferably sand, chalk and/or other mineral materials.

According to still another special embodiment said glue layer may be applied in liquid form, e.g. by spraying liquid coPET. Such liquid glue or liquid coPET may be obtained from melting pellets containing the glue or coPET. The spraying may be applied to, preferably the back, of the tufted primary backing. In accordance with the present special embodiment, filler material may be strewn or scattered into the still liquid glue or coPET to add weight, or the filler material may be applied first and is then adhered by the sprayed on liquid glue, or both.

Preferably, said coPET is available in said glue layer in an amount of at least 20 weight percent or at least 25 weight percent, such as at least 50 weight percent, even at least 60 weight percent such as at least 75 weight percent.

Preferably said glue layer is essentially or wholly built from bicomponent filaments having a ratio of PET-coPET between 85/15 and 15/85, such as between 80/20 and 20/80, even between 75/25 ad 25/75, or between 15:85 and 25:75, preferably about 20:80. Preferably the spunbonded filaments of said glue layer are uncompacted. Compaction and/or calendering of the glue layer has a risk of lowering loft.

The inventive concepts of the present invention are not limited to PET/coPET based carpets, but may find wider application in the field of carpet and rug manufacturing. For this reasons, the present invention according to its second independent aspect also concerns a method for manufacturing a carpet or a rug, wherein the method comprises at least the following steps:

the step of providing a primary backing;
the step of providing a glue layer;
the step of tufting yarn at least into said primary backing;
the step of activating said glue layer at least for partially fixing said yarn on said primary backing;
with as a characteristic that
said primary backing is a woven or non-woven layer comprising filaments comprising a first polymer;
said glue layer is a layer comprising a second polymer, the second polymer having a lower melting point as the first polymer.

The primary backing may be a woven or non-woven layer comprising continuous filaments of said first polymer. The primary backing may be a woven or non-woven layer comprising filaments of said first and said second polymer, wherein the said first polymer is available in said primary backing in a higher amount than said second polymer.

The glue layer may be a layer comprising at least 15% of said second polymer, such as at least 20%, even at least 30%, optionally at least 40% or even at least 50%.

According to some embodiments, the method for manufacturing a carpet or a rug, may comprise at least the following steps:

the step of providing a primary backing;
the step of providing a glue layer;
the step of tufting yarn at least into said primary backing;
the step of activating said glue layer at least for partially fixing said yarn on said primary backing;
with as a characteristic that
said primary backing is a woven or non-woven layer comprising filaments comprising a first polymer, preferably continuous, filaments of a first polymer and a lower melting second polymer, wherein said first polymer is available in said primary backing in a higher amount than said second polymer;
said glue layer is a layer consisting for 50% or more out of said second polymer.

It is clear that the invention of the present second aspect may show the features of the first aspect and/or the preferred embodiments thereof, without the first polymer necessarily being PET, and without the second polymer necessarily being coPET.

For example, said second polymer may be coPET, amorphous polyolefin, ethylene vinylacetate or low molecular weight polypropylene.

Preferably said glue layer is at least provided as a non-woven comprising filaments comprising said second polymer, and/or the second polymer in powder form and/or is at least provided by spraying a liquid comprising said second polymer, such as a molten second polymer, or applying a paste comprising said second polymer to e.g. the tufted primary backing. For example pellets of the second polymer, e.g. coPET, may be molten and sprayed on. In such embodiment, applying pressure to the whole may be sufficient to fix the yarn on the primary backing, although heated calender fusing may also be applied.

Upon the provision of a glue layer in powder form, liquid form or paste form, besides said polymer content, said glue layer may comprise filler materials, such as sand, chalk or other mineral materials. However, in accordance with the second independent aspect, the polymer content of the glue layer, i.e. without the filler material, should consist for more than 50% out of said second polymer (i.e. the weight of the second polymer over the total weight of the glue layer in which said second polymer is present, reduced by the weight of the filler, if any, present in said polymer composition).

The provision of a glue layer in powder form, liquid form or paste form, forms in itself an inventive aspect of the present disclosure, and therefore, the present invention, in accordance with its third independent aspect, also concerns a method for manufacturing a carpet or a rug, wherein the method comprises at least the following steps:

the step of providing a primary backing in the form of a woven or non-woven layer;
the step of providing a glue layer;
the step of tufting yarn at least into said primary backing;
the step of activating said glue layer at least for partially fixing said yarn on said primary backing;
with as a characteristic that
said glue layer is at least provided in powder form and/or in liquid form and/or in paste form.

It is clear that features of the present third aspect may be combined with features of the first and/or the second aspect of the present invention.

The third aspect further preferably comprises the step of introducing or incorporating filler materials into said glue layer, or into said powder, liquid, paste, to be applied as a glue layer. Preferably said filler material is at least sand, chalk or another mineral material. The incorporation of filler material adds weight to the obtained carpet or rug, which amongst others raises the consumer's sentiment of quality.

In accordance with a special embodiment of said third aspect, said primary backing is a non-woven layer made from filaments based on essentially one first polymer, while said powder of the glue layer is based on essentially one second polymer, wherein the second polymer has a lower melting temperature than said first polymer. Said first polymer may for example be PET, while said second polymer is coPET. The coPET polymer may be the same or similar, or may show the same of similar properties as those described in the first aspect of the invention, or, said first polymer is PP, while said second polymer is lower molecular weight PP.

The filaments contained in the primary backing may be monocomponent filaments, namely being entirely formed from said first polymer, although it is not excluded that bicomponent filaments would be used, wherein these filaments are formed preferably for 80% or more of the first polymer, optionally in combination with another polymer, such as the second polymer.

According to a special embodiment, said powder comprises granules composed from said second polymer and filler material. Preferably said filler material is an inorganic, stony or rocky material, such as sand and/or chalk. With such an embodiment weight can be added to the carpet or rug, such that the carpet may lay steadily on the subsurface. Weight also adds to the consumer's sentiment of quality.

In alternative embodiments, the glue layer may be a woven or non-woven layer comprising filaments comprising the second polymer. The glue layer may be a woven or non-woven layer comprising filaments of the first polymer and the second polymer, optionally wherein said first polymer is available in said glue layer in a lower amount than said second polymer. The filaments in said glue layer preferably at least may comprise bicomponent filaments, which may be of the homo/homo type, or of the sheath/core type, wherein the core is preferably the first polymer, while the sheath is the second polymer. In the alternative, the glue backing may comprise filaments from the first polymer and filaments from the second polymer, which filaments may be intermingled. Though the first and second polymer filaments may have an identical thickness (or dpf), the second polymer filaments may be of a different, preferably smaller filament titer as compared to the first polymer filaments. The cross sectional shapes of the first and second polymer filaments may be identical or different.

It is clear that the present invention also in general relates to carpet or rugs which are obtained or obtainable with any of the methods of the present invention or combinations thereof.

According to a fourth independent aspect, the present invention also in general relates to a carpet or rug, wherein this carpet or rug comprises yarn tufted and glued to a backing structure, with as a characteristic that said glue is essentially one of coPET, ethylene vinylacetate, amorphous polyolefin and low melt polyolefins. Herewith it is meant that no other glue is present than one, and only one of coPET, ethylene vinylacetate, amorphous polyolefin and low melt polyolefins. Due to the fact that the low melting polymer or glue of the carpet is only one of the above polymers, easy separation can be obtained e.g. in a post-consumer recycling unit. Preferably the glue is essentially coPET.

Preferably said backing structure and glue are essentially obtained, respectively, from a non-woven PET layer and coPET glue, or, alternatively, respectively from a PP based primary backing, e.g. a non-woven, and a low molecular weight polypropylene glue.

Preferably the yarn used in the carpet or rug of the fourth aspect of the invention is essentially PET yarn, nylon yarn or polypropylene yarn.

The carpet of the fourth aspect, or of the invention in general may be a broad loom carpet, having a width of at least 6 feet (1.8288 m) or at least 9 feet (2.7432 m), preferably at least 12 feet (3.6576 m), and preferably of 18 feet (5.4864 m) or less.

The backing structure of the carpet of the fourth aspect and/or of the other aspects is free from latex.

It is clear that the carpet of the fourth aspect may be obtained, or be obtainable, with the methods of the first, second or third aspect.

Where in the above polymers of low molecular weight are mentioned, preferably polymers with a molecular weight lower than 10000 gr/mol, or even lower than 5000 gr/mol are used. Where polymers of high molecular weight are mentioned, preferably polymers with a molecular weight higher than 10000 gr/mol, or even higher than 15000 gr/mol are used.

According to a further aspect of the invention, the method may further comprise the step of joining a secondary backing layer to the combination of the primary backing and glue layer. Such secondary backing layer may be an unsolid layer, i.e. a layer with internal cavities, from PET, coPET or combinations of PET and coPET. The PET used may be obtained from recycled material, e.g. from PET bottles or carpet waste, i.e. PET carpet waste.

The secondary backing may be a nonwoven, e.g. a carding batt or a felt, such as a spunbond, air entangled or needle felt, of PET and/or coPET fibers or filaments. As an example, a carding batt or needle felt of coPET with a surface weight in the range of 15 to 35 oz/yd$^2$ (509 to 1187 g/m$^2$) may be used, e.g. 17 oz/yd$^2$ (576 g/m$^2$), 24 oz/yd$^2$ (814 g/m$^2$) or 32 oz/yd$^2$ (1085 g/m$^2$).

Alternatively this secondary backing layer may be a foam layer, e.g. a PET foam layer, a coPET foam layer or a foam layer from a PET and coPET mixture. The foam may have open, closed or both open and closed cavities.

According to some embodiments, the secondary backing is joined to the primary backing by means of the glue layer, such as a low melting glue layer, e.g. a glue layer comprising powdery or liquid PET, coPET or a combination of PET and coPET, or the glue layer comprising bicomponent filaments.

According to some embodiments, the secondary backing is joined to the combination of the primary backing and the glue layer, using a second glue layer. This secondary glue layer may preferably comprise or even consist of powdery or liquid PET, coPET or a combination of PET and coPET, such as molten coPET. The powdery or liquid material may be extruded, poured, or sprayed to the combination of the primary backing and the glue layer. The secondary glue layer may be loaded with fillers, e.g. $CaCO_3$ particles.

According to another aspect of the invention, the carpet according to the invention is combined, in use, with an underlay. An underlay is installed on the surface to be covered, upon which the carpet is installed. This underlay may be a nonwoven, e.g. a carding batt or a felt, such as a spunbond, air entangled or needle felt, of PET and/or coPET fibers or filaments.

So according to this fourth aspect, a carpet or rug according to this fourth aspect may comprise
- a primary backing being a woven or non-woven layer comprising filaments of a first polymer, preferably polyethylene terephthalate (PET);
- a tufted pile tufted on said primary backing, said pile being present at a first side of the primary backing;
- a glue layer present at the second side of the primary backing, said glue layer resulting from a solidified molten second polymer, preferably copolymer of polyethylene terephthalate (coPET);
- optionally a secondary backing layer which is present at the side of the glue layer opposite to the side of the glue layer which is contacting the primary backing.

More preferred, a carpet or rug according to this fourth aspect may comprise
- a primary backing being a woven or non-woven layer comprising filaments comprising polyethylene terephthalate (PET), anchored to each other by means of masses of copolymer of polyethylene terephthalate (coPET);
- a tufted pile tufted on said primary backing, said pile being present at a first side of the primary backing;
- a glue layer present at the second side of the primary backing, said glue layer resulting from a solidified molten coPET, further comprising filaments comprising PET embedded in said solidified molten coPET;
- optionally a secondary backing layer which is present at the side of the glue layer opposite to the side of the glue layer which is contacting the primary backing.

This secondary backing layer may adhere to the primary backing layer by means of the glue layer.

The second polymer, such as the coPET, is in the process of producing the carpet or rug, first molten and thereafter again solidified. As such it forms a polymer matrix (e.g. a coPET matrix) in which filaments of the first polymer (e.g. PET filaments), if any, may still be present. This polymer matrix will appear as a film of said polymer matrix, in which optionally first polymer filaments, such as PET filaments, are present.

BRIEF DESCRIPTION OF THE FIGURES

With the intention of better showing the characteristics according to the invention, in the following, as examples without limitative character, some embodiments are described, with reference to the accompanying drawings, wherein.

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics of different aspects of the invention may be combined in any suitable manner, such as in one or more embodiments, as would be apparent to one of ordinary skill in the art.

When reference is made to a percentage (%), unless otherwise indicated this percentage refers to weight percentage, i.e. the weight of the component itself over the total weight of the composition in which the component is present.

Unless otherwise indicated, the term "amount" refers to the amount in weight.

DETAILED DESCRIPTION OF VARIOUS EMBODIMENTS

Figure 1:
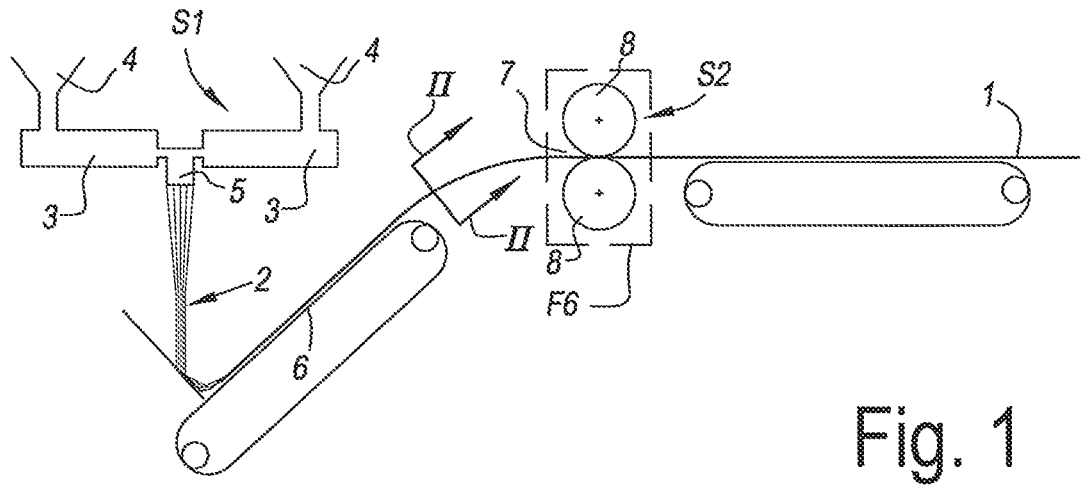
FIG. 1 schematically illustrates the step of providing a primary backing or a glue layer in a method in accordance with amongst others the first aspect of the invention.

FIG. 1 illustrates an exemplary step S1 of providing a primary backing 1. In this case the primary backing 1 is a non-woven layer comprising continuous filaments 2, provided by spunbonding technology. In this case the filaments 2 are bicomponent filaments. Two extruders 3, each for one of the components of the filaments, are fed with respective polymer chips through respective inlets 4. Filaments 2 are formed by extrusion and drawing through a spinning die 5. The filaments 2 are laid on a moving screen or belt 6 to form a web. The web may, like in the example, optionally be subjected to a bonding step S2 e.g. by calender bonding. In calender bonding the web of loose filaments 2 is passed through the nip 7 of a set of rollers 8, of which preferably at least one is heated. One or more of the rollers 8 may optionally be patterned.

Figure 2:
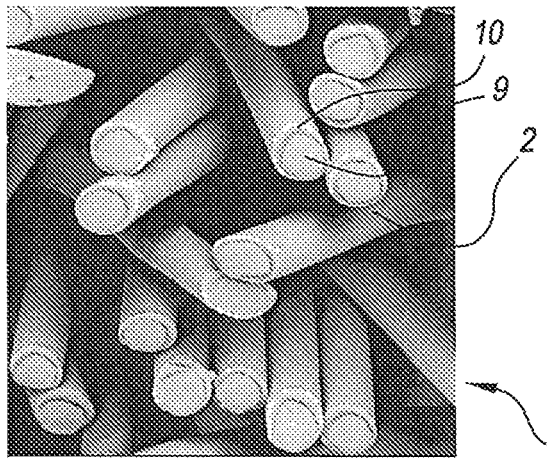
FIGS. 2 and 3 are photographs taken with a microscope showing the filaments of the glue layer in a cross-section according to lines II-II of FIG. 1 for two different compositions of bicomponent filaments.

FIG. 2 shows that, as afore stated, bicomponent filaments 2 of the sheath 9/core 10 type may be produced, in this case illustrated for the glue layer 11. These filaments are obtained through a process similar as that illustrated in FIG. 1. The core 9 consists of a first polymer, and the sheath 10 consists of a lower melting second polymer, wherein the first polymer, preferably PET, is available in said glue layer in an amount of 50 wt % or less, while said second polymer, preferably coPET, is available in an amount of 50 wt % or more. In accordance with a preferred embodiment of the first aspect of the invention the core 9 consists of PET, while the sheath 10 consists of coPET. A concentric configuration is used with a ratio PET/coPET of about 50/50. The illustrated glue layer is uncompacted and unbounded.

Figure 3:
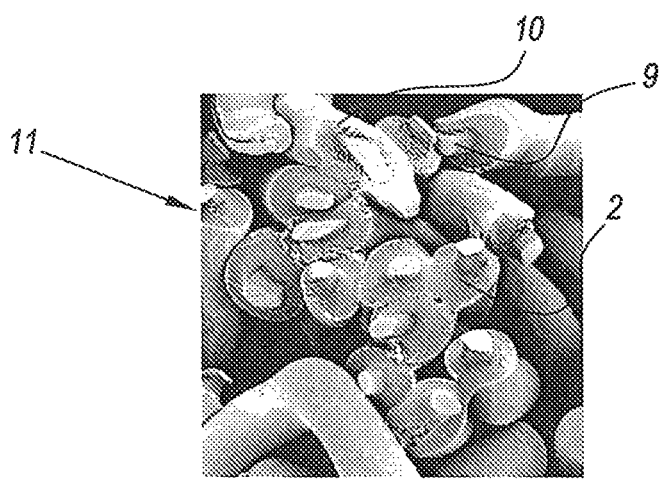

FIG. 3 shows bicomponent filaments 2 of an alternative glue layer. In accordance with a preferred embodiment of the first aspect of the invention the core 9 consists of PET, while the sheath 10 consists of coPET. A concentric configuration is used with a ratio PET/coPET of about 20/80. The glue layer 11 is uncompacted and unbounded. The glue layer 11 of FIG. 3 exhibits higher loft than the glue layer 11 of FIG. 2. The loft is at least partially to be attributed to the differential shrinking of the material of the sheath 10 and core 9 of the filaments 2. FIG. 3 shows some fusing between the filaments 2, which is due to the filaments 2 touching as they move due to shrinking.

Figure 4:
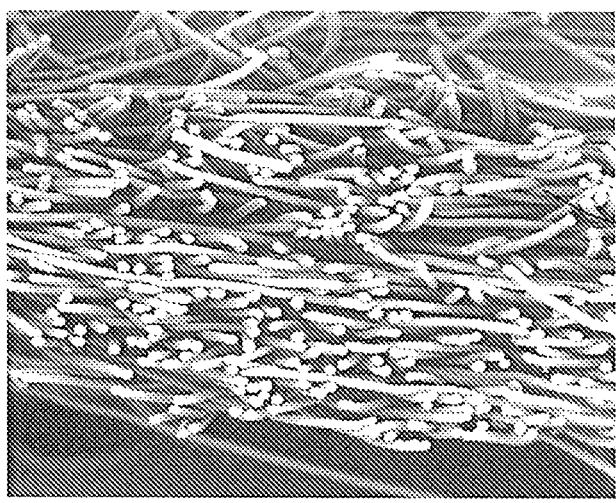
FIGS. 4 and 5 are photographs taken with a larger magnification of the glue layers of FIGS. 2 and 3 respectively.
Figure 5:
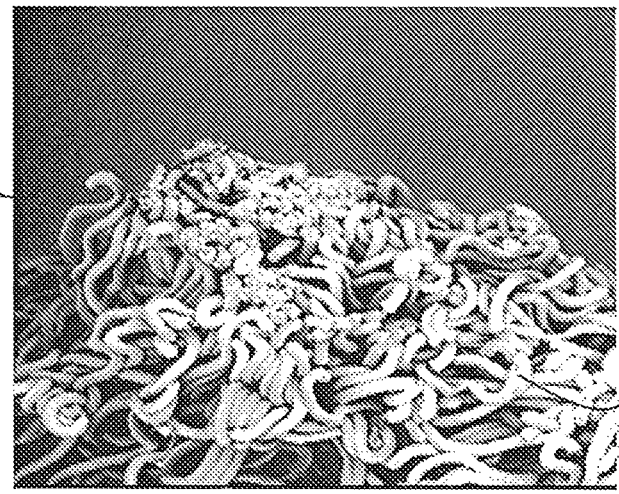

FIG. 4 illustrates the glue layer 11 of FIG. 2 at a larger scale, and FIG. 5 illustrates the glue layer 11 of FIG. 3 at a larger scale.

The filaments 2 of the glue layer 11 are of a lower dpf size than the filaments 2 of the primary backing 1. The filaments 2 of the illustrated glue layer 11 have a size smaller than 5 dpf, while the filaments 2 of the primary backing 1 preferably have a size larger than 6 or larger than 8 dpf. The surface weight of the primary backing 1 is above 100 grams per square meter. The surface weight of the glue layer 11 is above 85 grams per square meter.

Figure 6:
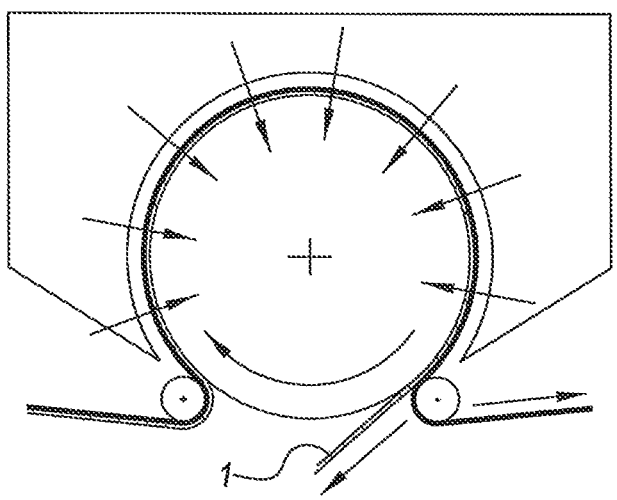
FIG. 6 in a larger view illustrates the technique of through air bonding as a variant for the area indicated with F6 in FIG. 1.

FIG. 6 illustrates through air bonding as an alternative technology for the calender bonding of FIG. 1. This technology involves passing hot air through the unbonded web in order to heat and at least partially melt the second polymer or coPET. In the through air bonding process the applied pressure is minimum and almost no compaction of the web is obtained.

Figure 7:
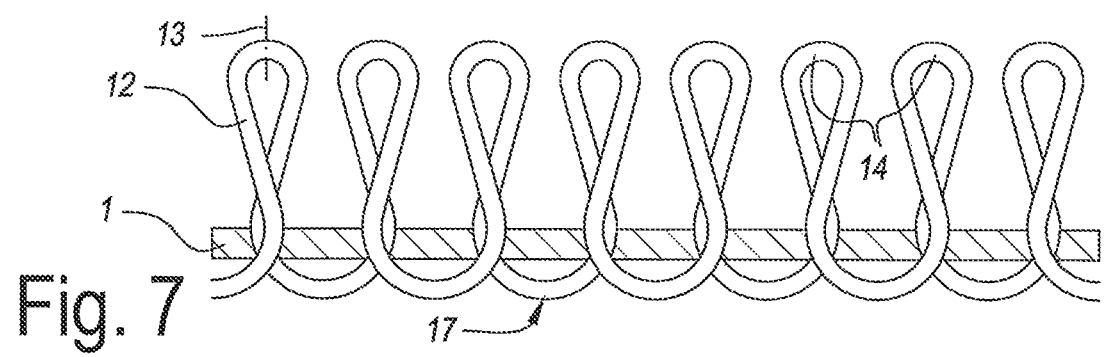
FIG. 7 represents a tufted primary backing.

FIG. 7 shows the primary backing 1 after the step of tufting yarn 12. As indicated with the line 13 the loops 14 of the yarn 12 are preferably cut to create the piles 15 of the carpet 16. The yarn 12 is preferably a PET yarn that may be obtained from recycled material, e.g. from PET bottles.

Figure 8:
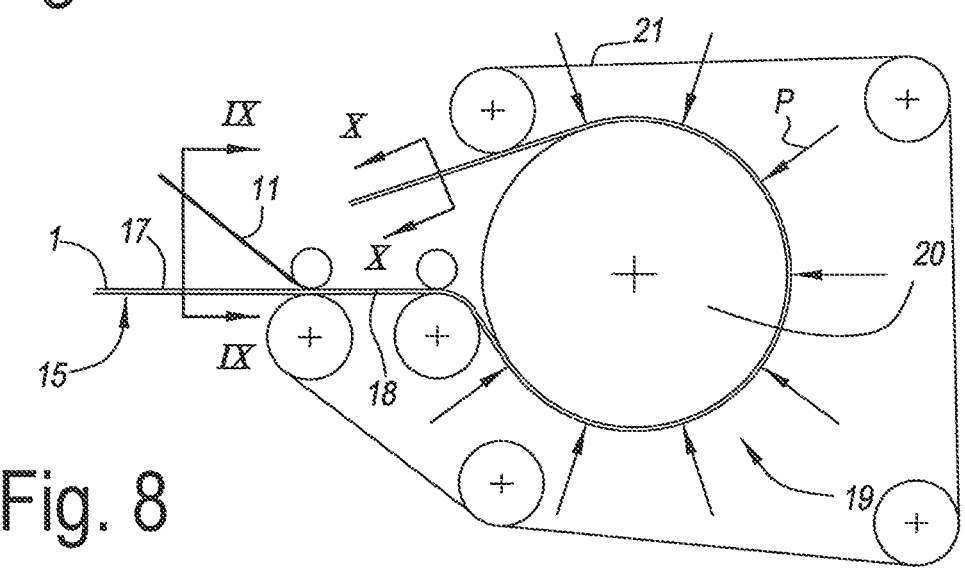
FIG. 8 schematically illustrates the step of providing the glue layer on the tufted primary backing of FIG. 7.

FIG. 8 schematically illustrate how the glue layer 11 can be provided on the back 17 of the tufted primary backing 1. The whole 18 can then be fused, wherein the glue layer 11 is activated for at least partially fixing the yarn 12 or piles 15 on said primary backing 1. The fusing operation is in the example executed in a rotary thermal lamination device 19. The primary backing 1 and the glue layer 11 are lead over a heated drum 20. Pressure P is applied to the whole by means of the conveyor 21. Alternatively, but not illustrated here, one or more nip rolls could be used as well for creating the pressure P.

Figure 9:
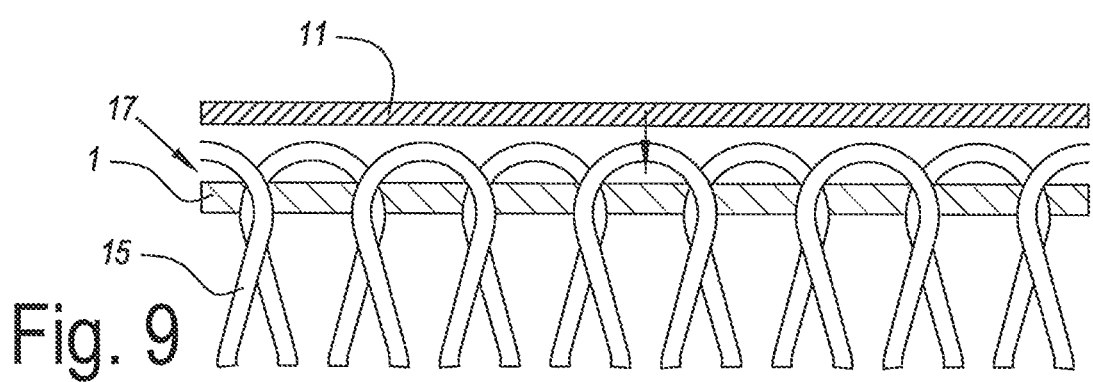
FIGS. 9 and 10 on a larger scale show cross-sections according to the lines IX-IX, and X-X respectively in FIG. 8.
Figure 10:
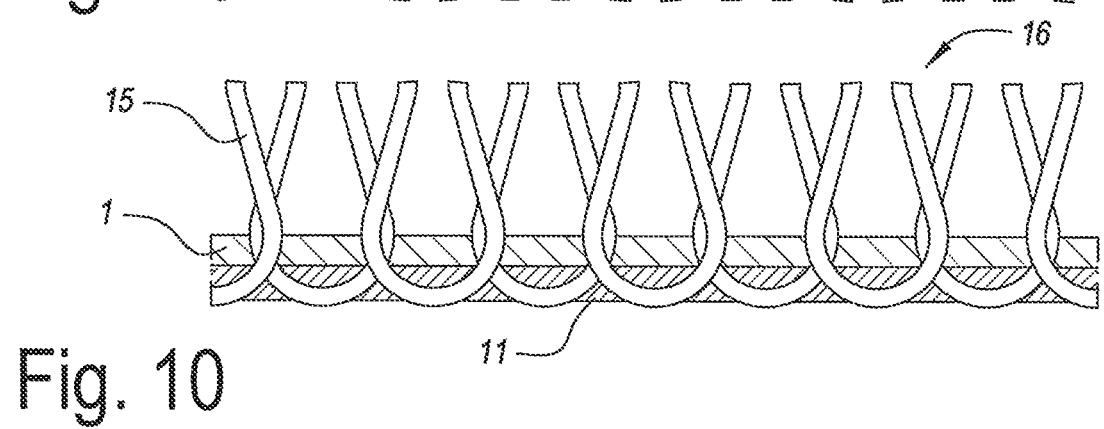

FIGS. 9 and 10 respectively show the carpet 16 before and after activation of the glue layer 11.

Figure 11:
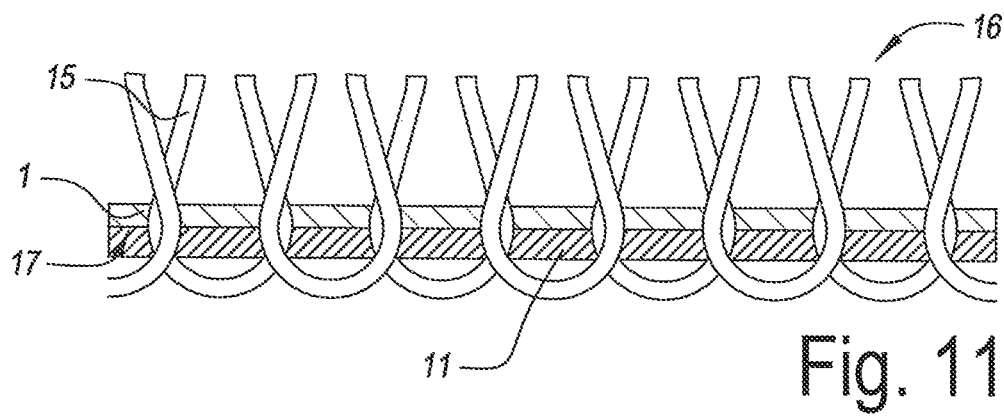
FIGS. 11 to 13 in a view similar to that of FIG. 10 represent variants.
Figure 12:
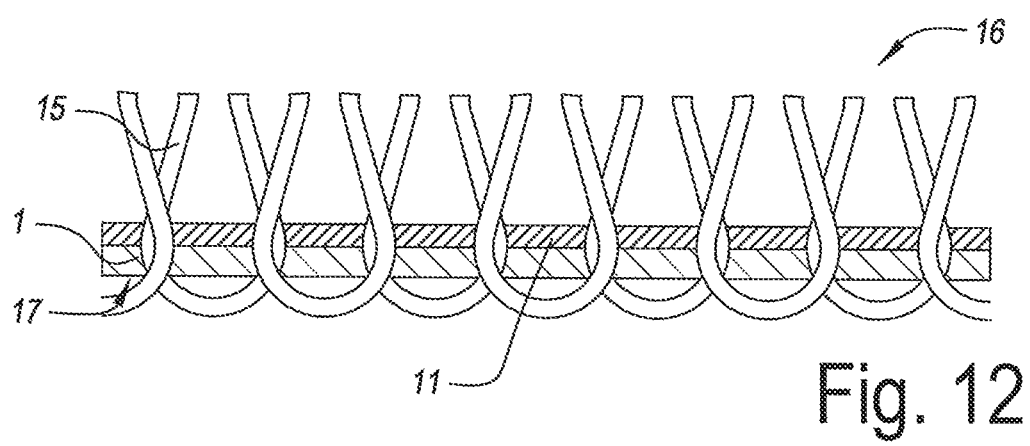

FIGS. 11 and 12 show alternative embodiments wherein the yarn 12 is tufted into both the primary backing 1 and the glue layer 11. In the case of FIG. 11 the glue layer 11 is applied underneath or at the back 17 of the primary backing 1. In FIG. 12, the glue layer 11 is applied on top of the primary backing 1, namely at the side of the carpet 16 which will be facing up in use.

Figure 13:
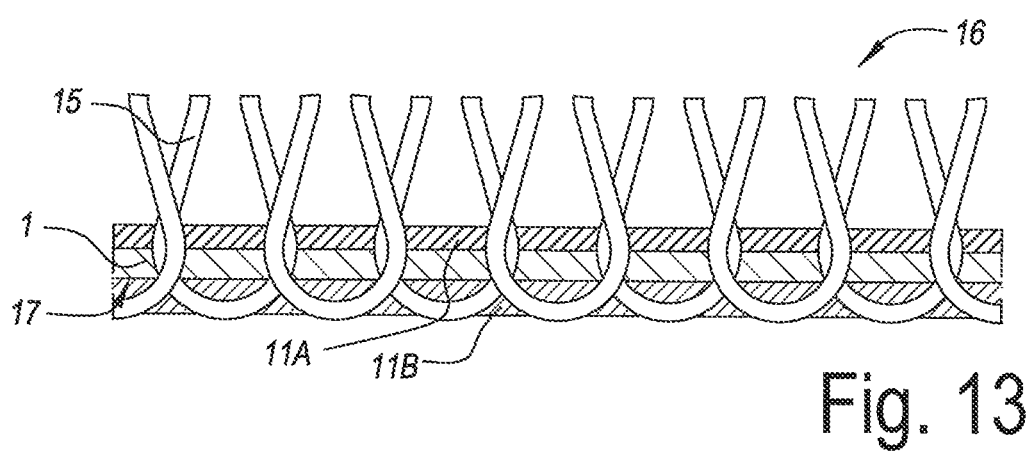

FIG. 13 shows a further example wherein a second glue layer 11B has been applied to the embodiment of FIG. 12, such that the primary backing 1 at both flat sides thereof is flanked by a glue layer 11A-11B. The tufting operation has been carried out on the assembly of the primary backing 1 and the first glue layer 11A. The second glue layer 11B has been applied after the tufting operation, in the same or similar way as was the case for FIGS. 9 and 10. It is clear that a similar embodiment could be reached by tufting in all three of the primary backing 1, the first glue layer 11A and the second glue layer 11B.

According to a special embodiment, not represented here, a sandwich is made of, from top to bottom, a first primary backing, a glue layer, and a second primary backing, wherein the sandwich is tufted. Preferably the second primary backing is of a lower surface weight than the first primary backing. For example, the first primary backing may have a weight of 100 grams per square meter or higher, while the second primary backing has a weight of between 40 and 85 grams per square meter. It is clear that for the composition of the primary backings and the glue layer the compositions disclosed earlier may be used. Preferably, the primary backings are non-woven layers of continuous bicomponent filaments having a ratio PET/coPET of more than 50 percent, for example about 80/20. The glue layer is preferably a non-woven layer of continuous bicomponent filaments having a ratio PET/coPET of less than 50 percent, for example about 20/80.

Figure 14:
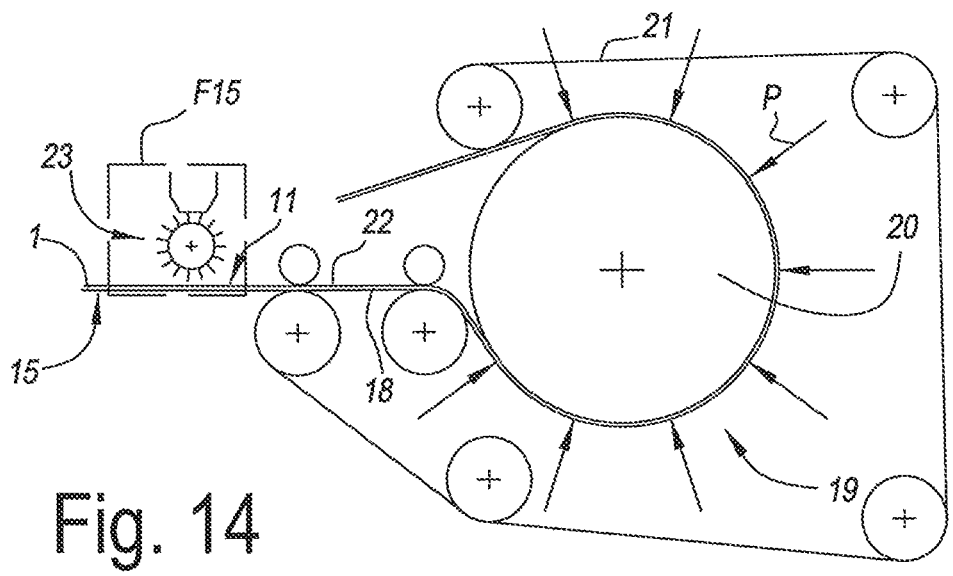
FIG. 14 in a view similar to that of FIG. 8 represents a variant.

FIG. 14 illustrates a method in accordance with amongst others the third independent aspect of the invention, wherein the glue layer 11B is provided in powder form. As illustrated here the powder 22 may be distributed on the bottom of the tufted substrate, e.g. on the bottom side or back of the tufted primary backing 1. The distribution may be executed by means of a scattering or strewing apparatus 23. As schematically illustrated in FIG. 15, the powder 22 is dropped from a reservoir 24 on a patterned roller 25, from which it is released by gravity and/or vibration and/or rubbing e.g. with a brush 26.

As explained in the introduction the powder 22 may be a mixture of glue powder, e.g. coPET powder, and filler material, e.g. sand or chalk, or may comprise granulate formed from both glue and filler material. According to an alternative a plurality of powder depositing operations may be performed, for example at least one with glue and at least one with filler material.

Figure 15:
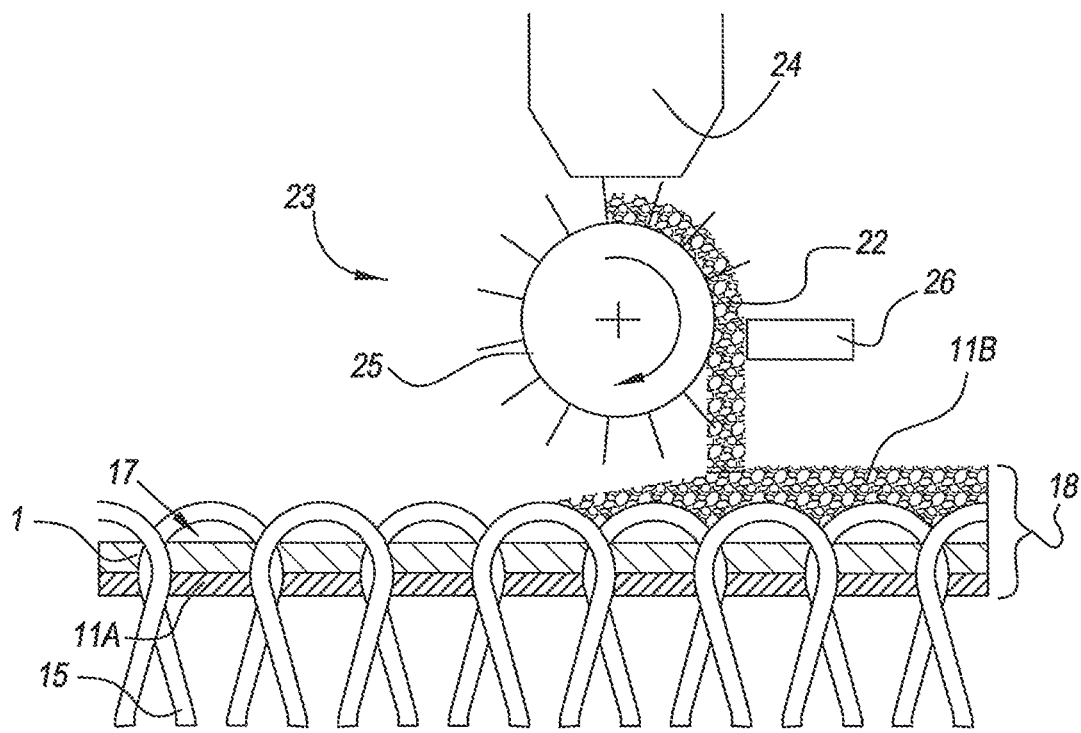
FIG. 15 on a larger scale shows a view on the area indicated with F15 in FIG. 14.

In the particular case illustrated in FIG. 15, the powder 22 is applied as a second glue layer 11B on the back of a tufted substrate comprising both a primary backing 1 and a first glue layer 11A. It is however clear that any glue layer 11 may be applied by means of powder deposition.

It is further clear that any of the glue layers 11 may comprise filler material. Preferably only the glue layers 11 that are not tufted comprise filler materials.

The present invention is in no way limited to the above described embodiments, but such methods, carpets and rugs may be realized according to several variants without leaving the scope of the invention.

The invention further relates to the following methods and carpets as defined by the below numbered paragraphs.

1.—A method for manufacturing a carpet or a rug, wherein the method comprises at least the following steps:
the step (S1-S2) of providing a primary backing (1);
the step of providing a glue layer (11);
the step of tufting yarn (12) at least into said primary backing (1);
the step of activating said glue layer (11) at least for partially fixing said yarn (12) on said primary backing (1);
characterized in that
said primary backing (1) is a woven or non-woven layer comprising, filaments (2) comprising polyethylene terephthalate (PET);
said glue layer (11) is a layer comprising copolymer comprising polyethylene terephthalate (coPET) wherein the coPET has a lower melting temperature than the PET.

2.—A method according to paragraph 1 above, characterized in that said primary backing (1) is a woven or non-woven layer comprising continuous filaments (2) of polyethylene terephthalate (PET).

3.—A method according to paragraph 1 or 2 above, characterized in that said primary backing (1) is a woven or non-woven layer comprising filaments (2) of polyethylene terephthalate (PET) and copolymer of polyethylene terephthalate (coPET), wherein the coPET has a lower melting temperature than the PET and wherein said PET is available in said primary backing (1) in a higher amount than said coPET.

4.—A method according to any one of the paragraphs 1 to 3, characterized in that said glue layer (11) is a layer comprising at least 15% of coPET.

5.—A method according to any of the paragraphs 1 to 4, characterized in that said yarn (12) is a yarn based on PET.

6.—A method according to any of the paragraphs 1 to 5 above, characterized in that said filaments (2) in said primary backing (1) at least comprise bicomponent filaments (2).

7.—A method according to paragraph 6 above, characterized in that said bicomponent filaments (2) are of the sheath/core type, 8.—A method according to paragraph 7 above, characterized in that the core (9) is PET, while the sheath (10) is coPET.

9.—A method according to any of the paragraphs 1 to 5 above, characterized in that the primary backing comprises PET filaments and coPET filaments 10.—A method according to any of the paragraphs 1 to 9 above, characterized in that said PET is available in said primary backing in an amount of at least 60 weight percent.

11.—A method according to any of the paragraphs 1 to 8 above, characterized in that the primary backing is of 100% PET.

12.—A method according to any of the paragraphs 1 to 11 above, characterized in that said primary backing (1) is a non-woven layer.

13.—A method according to paragraph 12 above, characterized in that said primary backing (1) is provided by means of spunbonding technology, meltblowing, carding and/or needling.

14.—A method according to any of the paragraphs 1 to 13 above, characterized in that said glue layer (11) is a woven or non-woven layer comprising filaments (2) comprising coPET.

15.—A method according to paragraph 14 above, characterized in that said filaments (2) in said glue layer (11) at least comprise bicomponent filaments (2) comprising PET and coPET.

16.—A method according to any of the paragraphs 1 to 14 above, characterized in that the primary backing comprises PET filaments and coPET filaments 17.—A method according to any of the paragraphs 1 to 11 above, characterized in that said glue layer (11) is at least provided as a powder (22) comprising said coPET.

18.—A method according to any of the paragraphs 1 to 11 above, characterized in that said glue layer (11) is at least provided as a liquid comprising said coPET.

19.—A method according to paragraph 18 above, characterized in that the liquid is molten coPET.

20.—A method according to any of the paragraphs 1 to 19 above, characterized in that said coPET is available in said glue layer (11) in an amount of at least 20 weight percent.

21.—A method according to any of the paragraphs 1 to 20 above, characterized in that said glue layer (11) is applied to the primary backing (1) after the relevant part of said primary backing (1) has been tufted.

22.—A method according to any of the paragraphs 1 to 20 above, characterized in that said glue layer (11) is applied to the primary backing (1) before the relevant part of said primary backing (1) is tufted, wherein the step of tufting comprises tufting yarn (12) into at least said primary backing (1) and said glue layer (11).

23.—A method according to any of the paragraphs 1 to 22 above, characterized in that said step of activation said glue layer (11) is at least executed with heat and/or pressure, 24.—A method according to paragraph 23 above, characterized in that said step of activation said glue layer (11) is at least executed by means of calender bonding or by means of a rotary thermal lamination device (19).

25.—A method according to any one of the paragraphs 1 to 24 above, wherein the method comprises the further step of joining a secondary backing layer to the combination of the primary backing and the glue layer.

26.—A method according to paragraph 25 above, wherein said secondary backing layer is an layer with internal cavities from PET, coPET or combinations of PET and coPET.

27.—A method according to paragraph 25 or 26 above, wherein said secondary backing layer is a nonwoven or a foam layer.

28.—A method according to any one of the paragraphs 25 to 27 above, characterized in that the secondary backing is joined to the primary backing by means of the glue layer or using a second glue layer, the secondary glue layer comprising or consisting of powdery or liquid PET, coPET or a combination of PET and coPET.

29.—A carpet or rug comprising
a primary backing being a woven or non-woven layer comprising filaments comprising polyethylene terephthalate (PET), anchored to each other by means of masses of copolymer of polyethylene terephthalate (coPET);
a tufted pile tufted on said primary backing, said pile being present at a first side of the primary backing;
a glue layer present at the second side of the primary backing, said glue layer resulting from a coPET matrix further comprising filaments comprising PET embedded in said coPET matrix;
optionally a secondary backing layer which is present at the side of the glue layer opposite to the side of the glue layer which is contacting the primary backing.

That which is claimed:

1. Method for manufacturing a carpet or a rug, wherein the method comprises at least the following steps:
   the step of providing a primary backing;
   the step of tufting yarn at least into said primary backing;
   the step of activating a glue layer at least for partially fixing said yarn on said primary backing;
   characterized in that
   said primary backing comprises a sandwich consisting of, from top to bottom, a first primary backing, the glue layer, and a second primary backing; wherein
   said glue layer is a layer comprising continuous bicomponent filaments having a core comprising polyethylene terephthalate (PET) and a sheath comprising a copolymer of polyethylene terephthalate (coPET), wherein the glue layer has a ratio of PET/coPET of about 20/80 by weight;
   said first and second primary backings are layers of continuous bicomponent filaments having a core comprising PET and a sheath comprising coPET, wherein the PET is present in an amount of more than 50 percent; and
   said first primary backing has a weight of 100 grams per square meter or higher, and said second primary backing has a weight of between 40 and 85 grams per square meter.

2. Method according to claim 1, characterized in that said glue layer is a woven or nonwoven layer.

3. Method according to claim 1, characterized in that said step of activating said glue layer is at least executed with heat and/or pressure.

4. Method according to claim 1, characterized in that said yarn is a yarn based on PET.

5. Method according to claim 1, wherein the method further comprises the step of adding a secondary backing layer.

6. Method according to claim 5, characterized in that said secondary backing layer comprises an unsolid layer comprising a material selected from the group consisting of PET, coPET, or a combination thereof.

7. Method according to claim 6, characterized in that said unsolid layer has internal cavities.

8. A carpet or rug comprising
   a primary backing comprising a sandwich consisting of, from top to bottom, a first primary backing, an activated glue layer, and a second primary backing; wherein said glue layer is a layer comprising continuous bicomponent filaments having a core comprising polyethylene terephthalate (PET) and a sheath comprising copolymer of polyethylene terephthalate (coPET) wherein the glue layer has a ratio of PET/coPET of about 20/80 by weight; said first and second primary backings are layers of continuous bicomponent filaments having a core comprising PET and a sheath comprising coPET having the PET present in an amount of more than 50 percent; and said first primary backing has a weight of 100 grams per square meter or higher, and said second primary backing has a weight of between 40 and 85 grams per square meter; and
   a tufted pile tufted on said primary backing, said pile being present at the top of the primary backing.

9. The carpet or rug according to claim 8, wherein the carpet or rug further comprises a secondary backing layer.

10. The carpet or rug according to claim 9, wherein said secondary backing layer comprises an unsolid layer comprising a material selected from the group consisting of PET, coPET, or a combination thereof.

11. The carpet or rug according to claim 10, wherein said unsolid layer has internal cavities.

* * * * *